(12) United States Patent
Hisaki et al.

(10) Patent No.: US 12,140,302 B2
(45) Date of Patent: Nov. 12, 2024

(54) ILLUMINATION DEVICE AND EXHIBITION APPARATUS

(71) Applicant: OMRON Corporation, Kyoto (JP)

(72) Inventors: Shohei Hisaki, Ichinomiya (JP); Junya Fujita, Ichinomiya (JP); Yoshihiko Takagi, Kyoto (JP); Yoshimasa Osumi, Ichinomiya (JP)

(73) Assignee: OMRON CORPORATION, Kyoto (JP)

( * ) Notice: Subject to any disclaimer, the term of this patent is extended or adjusted under 35 U.S.C. 154(b) by 533 days.

(21) Appl. No.: 16/757,439

(22) PCT Filed: Apr. 6, 2018

(86) PCT No.: PCT/JP2018/014757
§ 371 (c)(1),
(2) Date: Apr. 20, 2020

(87) PCT Pub. No.: WO2019/092901
PCT Pub. Date: May 16, 2019

(65) Prior Publication Data
US 2021/0190290 A1    Jun. 24, 2021

(30) Foreign Application Priority Data

Nov. 7, 2017    (JP) .................................. 2017-214601

(51) Int. Cl.
*A47F 3/00*    (2006.01)
*F21V 5/02*    (2006.01)
(Continued)

(52) U.S. Cl.
CPC ................ *F21V 5/02* (2013.01); *A47F 3/001* (2013.01); *G02B 6/0053* (2013.01);
(Continued)

(58) Field of Classification Search
CPC .......... A47F 11/10; A47F 3/001; A47F 1/126; A47F 5/0093; G02B 6/0095; F21S 4/28;
(Continued)

(56) References Cited

U.S. PATENT DOCUMENTS 5,136,480 A * 8/1992 Pristash ............... G02B 6/0005
362/23.15
8,337,034 B2 * 12/2012 Ronda .................. G02B 6/0003
362/99
(Continued)

FOREIGN PATENT DOCUMENTS

CN       1350683 A    5/2002
CN       101004244 A  7/2007
(Continued)

OTHER PUBLICATIONS

English translation of the International Search Report ("ISR") of PCT/JP2018/014757 mailed on Jun. 5, 2018.
(Continued)

*Primary Examiner* — Fatima N Farokhrooz
(74) *Attorney, Agent, or Firm* — METROLEX IP LAW GROUP, PLLC; Robert L. Scott, Esq.

(57) ABSTRACT

An illumination device includes a transparent light guide plate having an end face being an incident surface and a bend between the incident surface and a distal end face opposite to the incident surface, and a light source facing the incident surface. The light guide plate includes first prisms on a first surface extending from the incident surface to the bend to reflect light from the light source entering the light guide plate through the incident surface and emit light through a second surface opposite to the first surface, and second prisms on a third surface extending from the distal end face to the bend to reflect light from the light source entering the light guide plate through the incident surface (Continued)

and emit light through a fourth surface opposite to the third surface.

8 Claims, 6 Drawing Sheets

(51) Int. Cl.
*F21V 8/00* (2006.01)
*G07F 9/02* (2006.01)

(52) U.S. Cl.
CPC ........ *G02B 6/0058* (2013.01); *F21V 2200/20* (2015.01); *G02B 6/0073* (2013.01); *G07F 9/02* (2013.01)

(58) Field of Classification Search
CPC .. F21S 4/26; F21V 17/108; A47B 2220/0077; F21Y 2113/10; F21W 2131/405; F25D 27/00
See application file for complete search history.

(56) References Cited

U.S. PATENT DOCUMENTS

| | | | |
|---|---|---|---|
| 2001/0049893 A1 | 12/2001 | Maas et al. | |
| 2003/0046842 A1 | 3/2003 | Maas et al. | |
| 2005/0072032 A1* | 4/2005 | McCollum | G02B 6/0036 40/546 |
| 2008/0112166 A1 | 5/2008 | Kakizaki et al. | |
| 2010/0142183 A1* | 6/2010 | Lerenius | G02B 6/0003 362/85 |
| 2013/0051075 A1* | 2/2013 | Fujita | G02B 6/0036 362/613 |
| 2014/0126237 A1 | 5/2014 | Morino et al. | |
| 2015/0070928 A1 | 3/2015 | Rau | |
| 2015/0109813 A1* | 4/2015 | Birdwell | G02B 6/0008 362/555 |
| 2015/0198758 A1* | 7/2015 | Yamamura | H04N 1/02835 358/474 |
| 2016/0054601 A1* | 2/2016 | Kitamura | G02B 6/0036 349/33 |
| 2016/0207446 A1* | 7/2016 | Kumegawa | B60Q 1/0035 |
| 2016/0209575 A1* | 7/2016 | Fukui | G02B 6/0036 |
| 2019/0239660 A1* | 8/2019 | Smith | G02B 6/0095 |

FOREIGN PATENT DOCUMENTS

| | | | | |
|---|---|---|---|---|
| CN | 101182914 A | | 5/2008 | |
| CN | 102985954 A | | 3/2013 | |
| CN | 103807669 A | | 5/2014 | |
| CN | 103885115 A | | 6/2014 | |
| CN | 104414279 A | | 3/2015 | |
| CN | 106200110 A | | 12/2016 | |
| DE | 202014102618 | * | 8/2014 | .............. A47F 11/10 |
| JP | 2003-519810 A | | 6/2003 | |
| JP | 2011-34680 A | | 2/2011 | |
| JP | 2011123406 A | | 6/2011 | |
| JP | 2011-181221 A | | 9/2011 | |
| JP | 2012-22482 A | | 2/2012 | |
| JP | 2012-165877 A | | 9/2012 | |
| JP | WO2012128088 A1 | * | 7/2014 | .......... G02B 6/0095 |
| JP | 2015-054236 A | | 3/2015 | |

OTHER PUBLICATIONS

Written Opinion("WO") of PCT/JP2018/014757 mailed on Jun. 5, 2018.
Chinese Office Action (CNOA) issued on Nov. 17, 2020 in a corresponding Chinese patent application.
Chinese Office Action (CNOA) issued on Mar. 16, 2020 in a corresponding Chinese patent application.

* cited by examiner

ILLUMINATION DEVICE AND EXHIBITION APPARATUS

FIELD

The present invention relates to an illumination device including a light guide plate and an exhibition apparatus including the illumination device.

BACKGROUND

Vending machines commonly include illumination devices that illuminate multiple samples of commercial products for easy visibility. For example, illumination units each including a transparent body containing two differently-oriented light-emitting diodes (LEDs) may be installed in multiple upper and lower sample shelves on which product samples are displayed. The samples are illuminated from above and below (refer to, for example, Patent Literature 1).

CITATION LIST

Patent Literature

Patent Literature 1: Japanese Unexamined Patent Application Publication No. 2012-22482

SUMMARY

Technical Problem

Although the technique described in Patent Literature 1 can illuminate the product samples from above and below, users of vending machines usually view the product samples from the front. The front of the product samples is thus to be illuminated. Light emitters, such as LEDs, may be installed in front of the product samples for illuminating the samples from the front. In this case, the product samples may be partially hidden by, for example, the light emitters and the substrate on which the light emitters are mounted.

One or more aspects of the present invention are directed to an illumination device that can emit light in multiple directions.

Solution to Problem

One aspect of the present invention provides an illumination device. The illumination device includes a transparent light guide plate having an end face being an incident surface, and a bend located between the incident surface and a distal end face opposite to the incident surface, and a light source facing the incident surface. The light guide plate includes a plurality of first prisms on a first surface of the light guide plate extending from the incident surface to the bend to reflect light emitted from the light source and entering the light guide plate through the incident surface and emit the light through a second surface opposite to the first surface, and a plurality of second prisms on a third surface of the light guide plate extending from the distal end face to the bend to reflect light emitted from the light source and entering the light guide plate through the incident surface and emit the light through a fourth surface opposite to the third surface.

The illumination device with the above structure can emit light in multiple directions.

In the illumination device, the distal end face of the light guide plate may include a slope facing toward the incident surface.

The illumination device with the structure can illuminate an object located near the incident surface with light emitted through the distal end face of the light guide plate in addition to light emitted through the second surface or the fourth surface.

In the illumination device, the third surface of the light guide plate may include a surface of the light guide plate curved outward at the bend, and the light guide plate may further include a plurality of third prisms arranged in a predetermined pattern on the fourth surface. The plurality of third prisms may reflect light entering the light guide plate and emit the light through the third surface to display the predetermined pattern.

The illumination device with the structure can display a pattern with a glowing appearance, in addition to emitting light in multiple directions. In particular, when the viewer views an illumination target facing the fourth surface from in front of the third surface, the illumination device can display a pattern with a glowing appearance in a manner superimposed on the illumination target.

In the illumination device, the light guide plate may have a second incident surface on one of side surfaces of the light guide plate extending from the bend to the distal end face and adjacent to the distal end face. The illumination device may further include a second light source facing the second incident surface. Each of the plurality of third prisms may have a reflection surface facing the second light source to reflect light emitted from the second light source and entering the light guide plate through the second incident surface and emit the light through the third surface.

The illumination device with the structure uses different light sources for pattern display and illumination, and can increase the brightness of both the illumination light and the pattern.

In the illumination device, the light source may emit light having a color different from a color of light emitted from the second light source.

The illumination device with the structure can thus show different light colors between the pattern with a glowing appearance and the illumination.

In the illumination device, the third surface of the light guide plate may include a surface of the light guide plate curved inward at the bend, and the plurality of second prisms may be arranged in a predetermined pattern.

The illumination device with the structure can display the pattern with light emitted through the fourth surface, while illuminating the illumination target with light emitted through the second surface.

In the illumination device, the first surface may include a surface of the light guide plate curved inward at the bend.

The illumination device with the structure can emit light in different directions.

Another aspect of the present invention provides an exhibition apparatus. The exhibition apparatus includes a mount on which an exhibition target is mountable, and an illumination device that illuminates the exhibition target. The illumination device includes a transparent light guide plate having a back end face being an incident surface, a bend between the incident surface and a distal end face opposite to the incident surface, a section from the incident surface to the bend extending from back to front, and a section from the distal end face to the bend located in front of the exhibition target, and a light source facing the incident surface. The light guide plate includes a plurality of first prisms on a first surface of the light guide plate extending from the incident surface to the bend to reflect light emitted from the light source and entering the light guide plate through the incident surface and emit the light through a second surface opposite to the first surface, and a plurality of second prisms on a third surface of the light guide plate not facing the exhibition target and extending from the distal end face to the bend to reflect light emitted from the light source and entering the light guide plate through the incident surface and emit the light through a fourth surface opposite to the third surface.

The exhibition apparatus with the above structure can illuminate the exhibition target in multiple directions. The exhibition apparatus can also illuminate the exhibition target from the front without hiding the exhibition target with a part of the illumination device.

DETAILED DESCRIPTION

An illumination device according to one or more embodiments of the present invention will now be described with reference to the drawings. The illumination device includes a light guide plate formed from a material transparent to light from a light source. Light from the light source facing an incident surface, which is one of the side surfaces of the light guide plate, enters the light guide plate through the incident surface and propagates within the light guide plate. The light guide plate has a bend at a predetermined distance away from the incident surface. The light guide plate has a section extending from the incident surface to the bend and a section extending from the bend to a distal end face that is an end face opposite to the incident surface. Each section of the light guide plate includes multiple prisms on its surface not facing an illumination target to reflect light from the light source propagating within the light guide and emit the light through the other surface facing the illumination target. The illumination device can thus emit light in multiple directions. In the examples described below, for ease of explanation, the term front refers to a direction toward the viewer and the term back refers to the opposite direction.

Figure 1:
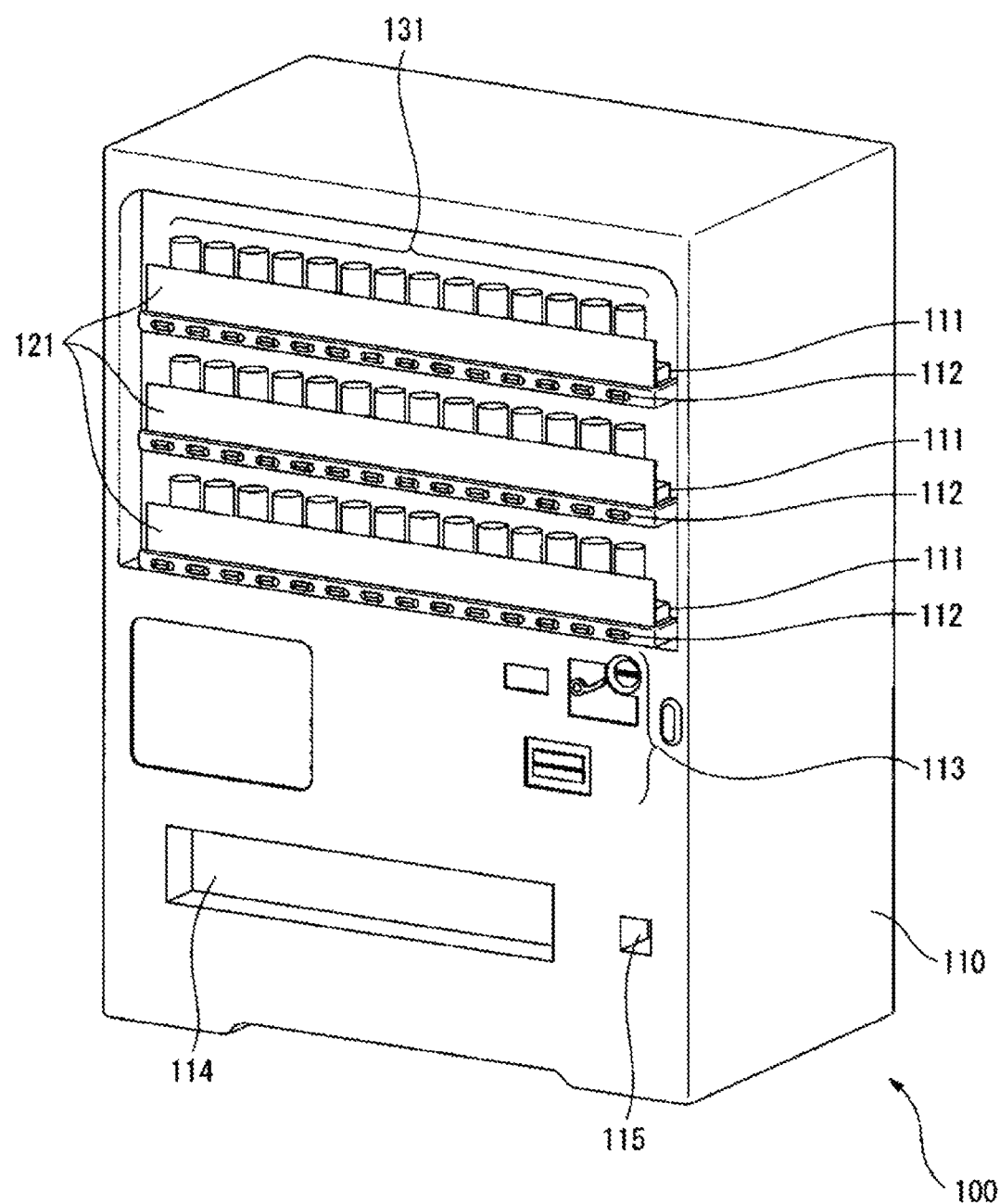
FIG. 1 is a schematic perspective view of a vending machine incorporating illumination devices according to one embodiment of the present invention.

FIG. 1 is a schematic perspective view of a vending machine incorporating illumination devices according to one embodiment of the present invention. A vending machine 100, which is an example of an exhibition apparatus, includes a housing 110 and illumination devices 121. The housing 110 includes three display shelves 111 on the upper half of the front surface, multiple selection buttons 112 located in the lower portion of each display shelf 111, a money slot 113 in the front surface, and a product outlet 114 and a coin return slot 115 located in the lower portion of the front surface. The illumination devices 121 each extend from the bottom to the front surface of the corresponding display shelf 111. Each display shelf 111 is an example of a mount on which an exhibition target is mounted. Each display shelf 111 receives product samples 131. Each product sample 131 is an example of an exhibition target to be displayed in the exhibition apparatus, and also an example of an illumination target to be illuminated by the illumination device 121. The vending machine 100 also includes, inside the housing 110, a storage (not shown) that stores the same products as those represented by the product samples 131 mounted on the display shelves 111, a transporting mechanism (not shown) that transports products from the storage to the product outlet 114, and a control circuit (not shown) that centrally controls the vending machine 100. The control circuit is connected to a sensor for recognizing money inserted through the money slot 113, and controls the transporting mechanism to transport a product from the storage to the product outlet 114 when the amount of inserted money is equal to or greater than the price of the product corresponding to a selection button 112 selected from the selection buttons 112 and pressed by a viewer (a user of the vending machine 100 in this example). When the amount of inserted money is greater than the price of the product corresponding to the pressed selection button 112, the control circuit returns the difference between the amount of inserted money and the product price to the coin return slot 115.

Figure 2:
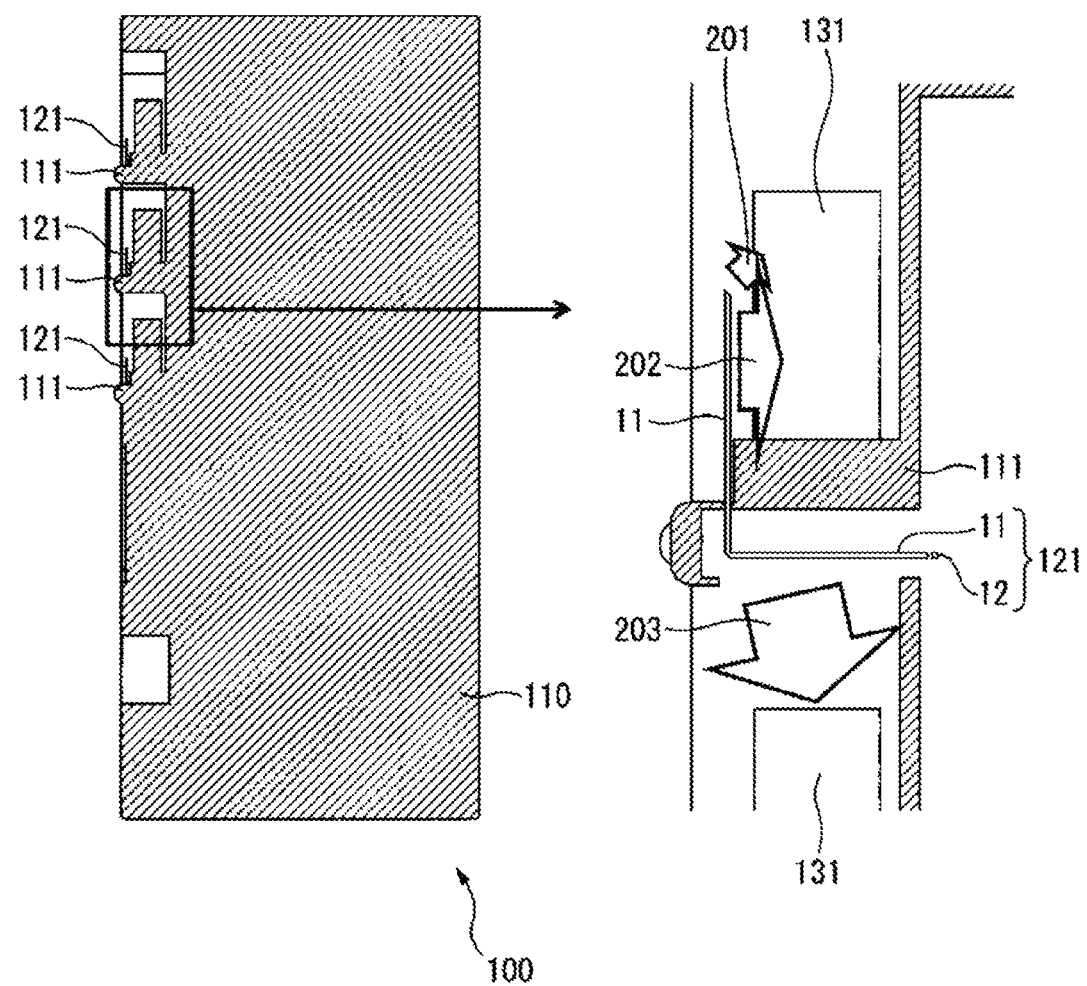
FIG. 2 is a cross-sectional side view of the vending machine showing a part including display shelves.

FIG. 2 is a cross-sectional side view of the vending machine 100 showing a part including the display shelves 111. The illumination devices 121 have the same structure, and one of the illumination devices 121 will now be described.

As shown in FIG. 2, each display shelf 111 includes the illumination device 121. Each illumination device 121 includes a light guide plate 11 and a light source 12.

The light guide plate 11 is transparent to light emitted from the light source 12. The light guide plate 11 is a molded plate formed from a resin transparent to visible light, such as polymethyl methacrylate (PMMA), polycarbonate, or a cyclic olefin polymer. The light guide plate 11 extends along and substantially parallel to the bottom surface of the display shelf 111 from the back to the front of the display shelf 111. The light guide plate 11 has an upward, substantially right angle bend near the front of the display shelf 111. The light guide plate 11 extends substantially parallel to the front surface of the housing 110 in front of the product samples 131 mounted on the display shelf 111. The light guide plate 11 has a back end face serving as an incident surface. Light emitted from the light source 12 facing the incident surface enters the light guide plate 11 through the incident surface and propagates within the light guide plate 11 while being totally internally reflected between the surfaces. The light guide plate 11 includes multiple prisms on each surface not facing the product samples 131. As indicated by arrows 201 to 203, light propagating within the light guide plate 11 is emitted toward the product samples 131 as reflected by each prism or through the distal end face of the light guide plate 11, which is the end face opposite to the incident surface. The illumination device 121 can thus illuminate the product samples 131 in multiple directions. The light guide plate 11 will be described in detail later.

The light source 12 includes multiple light emitters that emit visible light. The light emitters each have a light-emitting surface facing the incident surface of the light guide plate 11, and are arranged in a row in the longitudinal direction of the incident surface. The light emitters in the light source 12 are turned on or off in response to a control signal from the control circuit (not shown) in the vending machine 100. While the light source 12 is on as controlled by the control circuit, light emitted from the light source 12 enters the light guide plate 11 through the incident surface.

The light emitters in the light source 12 are, for example, light-emitting diodes, incandescent lamps, or fluorescent lamps. The light emitted from the light emitters in the light source 12 may be white light, or may be light with a specific color such as red, blue, or yellow.

Figure 3:
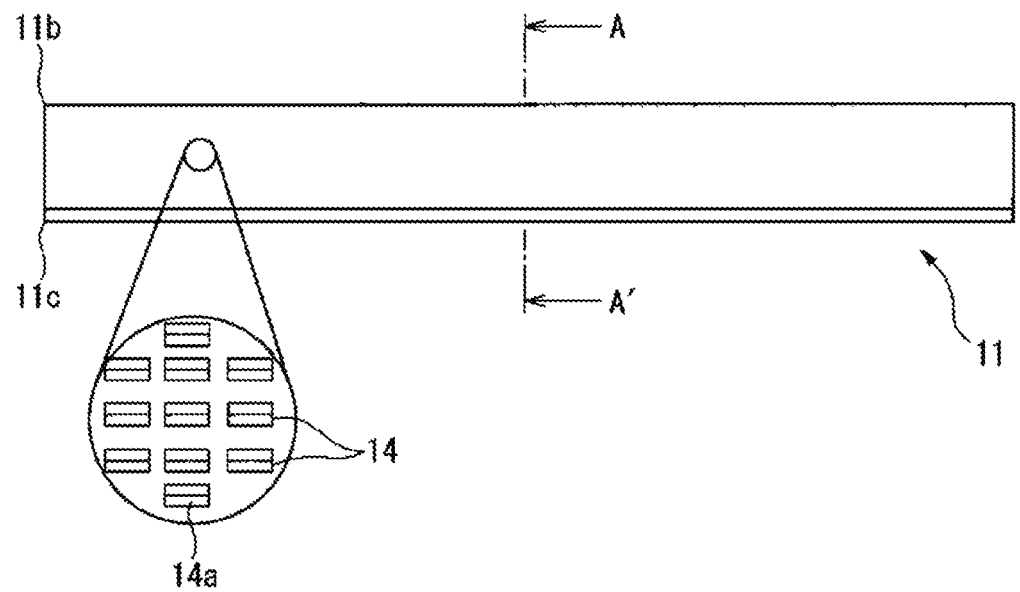
FIG. 3 is a schematic front view of a light guide plate.
Figure 4:
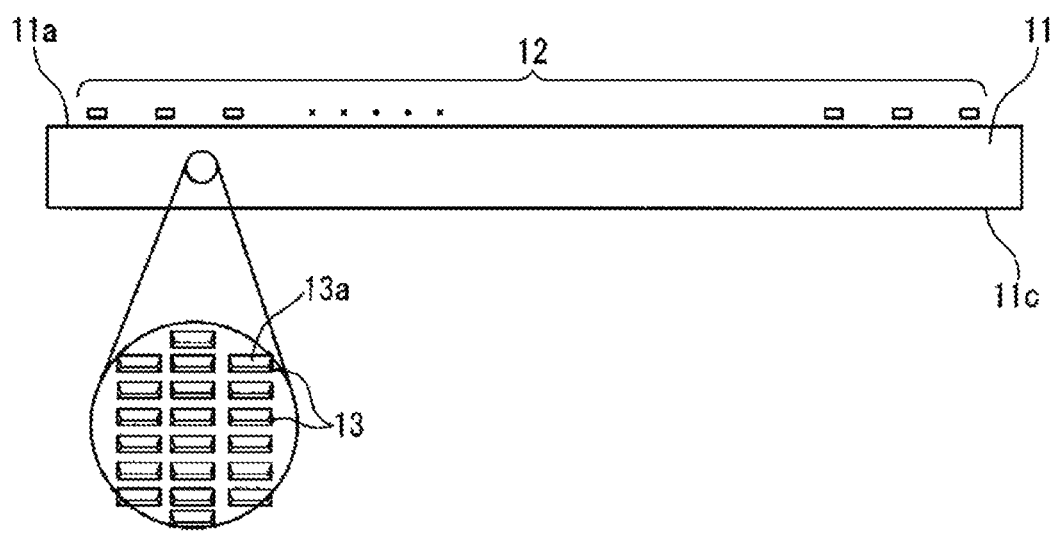
FIG. 4 is a schematic bottom view of the light guide plate.
Figure 5:
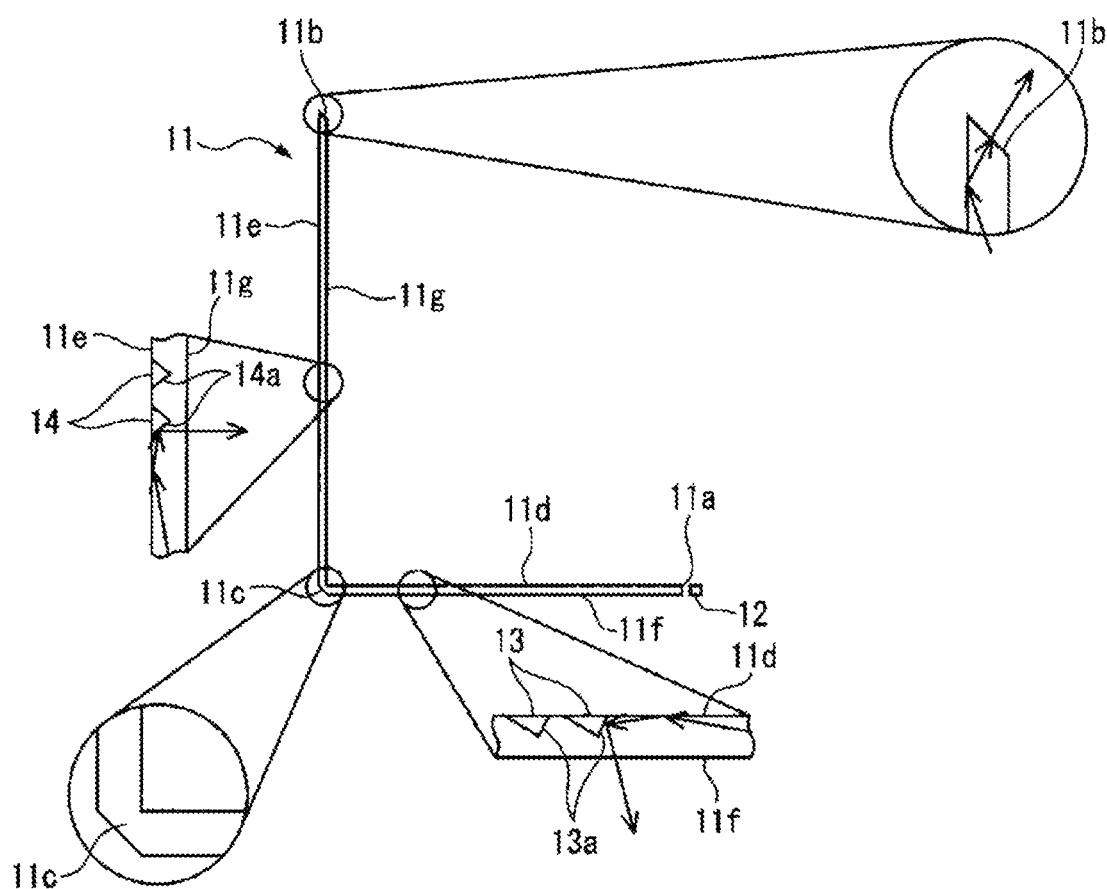
FIG. 5 is a schematic cross-sectional side view of the light guide plate taken along a line indicated by arrows AA' in FIG. 3.

The light guide plate 11 will now be described in detail. FIG. 3 is a schematic front view of the light guide plate 11. FIG. 4 is a schematic bottom view of the light guide plate 11. FIG. 5 is a schematic cross-sectional side view of the light guide plate 11 taken along a line indicated by arrows AA' in FIG. 3. As shown in FIGS. 4 and 5, the back end surface of a section of the light guide plate 11 extending along the bottom surface of the display shelf 111 serves as an incident surface 11a facing the light source 12. The light guide plate 11 has an upward bend 11c. In the present embodiment, the incident surface 11a and the bend 11c are substantially parallel to each other in their longitudinal directions. In some embodiments, the incident surface 11a and the bend 11c are not substantially parallel to each other in their longitudinal directions. For example, the light guide plate 11 may have the incident surface 11a at a greater distance to the bend 11c toward the left as viewed from the front. The light guide plate 11 includes multiple prisms 13 on the upper surface of its section extending from the incident surface 11a to the upward bend 11c, or more specifically, on a first diffusion surface 11d not facing the product samples 131 mounted on the lower display shelf 111. The light guide plate 11 also includes multiple prisms 14 on the front surface of its section extending from the bend 11c to a distal end face 11b, which is the surface not facing the product samples 131 mounted on the display shelf 111 located above the section from the incident surface 11a to the bend 11c, or more specifically, a second diffusion surface 11e including a surface of the light guide plate 11 curved outward at the bend 11c. The prisms 13 may be arranged on the entire first diffusion surface 11d, or may be arranged in a part of the first diffusion surface 11d. Similarly, the prisms 14 may be arranged on the entire second diffusion surface 11e, or may be arranged in a part of the second diffusion surface 11e. The positions and the areas where the prisms 13 and the prisms 14 are located may be determined in accordance with the position of the illumination device 121 with respect to the illumination target (product samples 131 in this example).

The bend 11c of the light guide plate 11 is chamfered at 45° with the second diffusion surface 11e and a first emission surface 11f, which is opposite to the first diffusion surface 11d and faces the product samples 131 on the lower display shelf 111. Near the chamfered bend 11c, light propagating within the light guide plate 11 bounces off each surface of the light guide plate 11 at smaller angles, thus reducing the likelihood that the light propagating within the light guide plate 11 leaks outside the light guide plate 11 at the bend 11c. Instead of being chamfered, the bend 11c may be outwardly rounded on the lower, front surface continuous with the first emission surface 11f and the second diffusion surface 11e. Near the rounded bend 11c, light propagating within the light guide plate 11 bounces off each surface of the light guide plate 11 at even smaller angles, thus further reducing the likelihood that the light propagating within the light guide plate 11 leaks outside the light guide plate 11 at the bend 11c. The upper, back surface at the bend 11c continuous with the first diffusion surface 11d may also be chamfered or rounded inwardly.

The distal end face 11b of the light guide plate 11 opposite to the incident surface 11a may have smaller heights in a part nearer the back surface than in a part nearer the front surface. The distal end face 11b may thus be formed as an angled slope. The slope allows more light to be emitted through the distal end face 11b toward the product samples 131 after propagating within the light guide plate 11 and reaching the distal end face 11b.

Light from the light source 12 enters the light guide plate 11 through the incident surface 11a. A part of the light from the light source 12 propagating within the light guide plate 11 by total internal reflection is first totally internally reflected at the prisms 13 on the first diffusion surface 11d located on the upper surface of the section of the light guide plate 11 extending from the incident surface 11a to the bend 11c, and then emitted through the first emission surface 11f, which is opposite to the first diffusion surface 11d and faces the product samples 131 on the lower display shelf 111. The emitted light illuminates the product samples 131 mounted on the lower display shelf 111 from above.

Another part of the light from the light source 12 entering the light guide plate 11 through the incident surface 11a passes through the bend 11c while being totally internally reflected within the light guide plate 11 and reaches the section extending between the bend 11c and the distal end face 11b. The light reaching the section between the bend 11c and the distal end face 11b is first totally internally reflected at the prisms 14 on the second diffusion surface 11e located on the front surface of the light guide plate 11, and then emitted through a second emission surface 11g, which is opposite to the second diffusion surface 11e and faces the product samples 131 mounted on the display shelf 111 located above the section extending from the incident surface 11a to the bend 11c. The emitted light illuminates the product samples 131 mounted on the display shelf 111 from the front.

At least a part of the light reaching the distal end face 11b without emitted through the light guide plate 11 is emitted through the distal end face 11b. A part of the light emitted through the distal end face 11b illuminates, from the front, the product samples 131 on the display shelf 111 located above the section extending from the incident surface 11a to the bend 11c. The light emitted through the distal end face 11b illuminates a higher area than the light emitted through the second emission surface 11g.

Each prism 13 is, for example, a substantially triangular groove having a predetermined length on the first diffusion surface 11d. The predetermined length is, for example, about several tens to several hundreds of micrometers. Each prism 13 has a reflection surface 13a at a predetermined angle (hereafter, slope angle) with the first diffusion surface 11d. The reflection surface 13a provides total internal reflection of the light from the light source 12 entering the light guide plate 11 to emit the light through the first emission surface 11f.

Each prism 13 has the reflection surface 13a facing toward the light source 12. More specifically, the reflection surface 13a is substantially parallel to the longitudinal direction of the incident surface 11a on a plane parallel to the first diffusion surface 11d. In some embodiments, to illuminate the product samples 131 located below the first emission surface 11f in different directions, the angle between the direction in which the reflection surface 13a of each prism 13 directly faces and the normal to the incident surface 11a may be set randomly for each prism 13.

The prisms 13 are arranged on the first diffusion surface 11d in a staggered manner, latticed, or randomly at a uniform density. To vary the brightness of the illumination depending on the position, the prisms 13 at different positions may be arranged at different densities on the first diffusion surface 11d, or more specifically, may be more densely arranged in brighter areas. For example, the product samples 131 may be illuminated at the front rather than at the back. The prisms 13 may thus be arranged more densely nearer the bend 11c.

Similarly, each prism 14 is, for example, a substantially triangular groove having a predetermined length on the second diffusion surface 11e. The predetermined length is, for example, about several tens to several hundreds of micrometers. Each prism 14 has a reflection surface 14a at a predetermined slope angle with the second diffusion surface 11e. The reflection surface 14a provides total internal reflection of light from the light source 12 entering the light guide plate 11 to emit the light through the second emission surface 11g.

Each prism 14 has the reflection surface 14a substantially parallel to the longitudinal direction of the bend 11c on a plane parallel to the second diffusion surface 11e. In some embodiments, to illuminate the product samples 131 located behind the second emission surface 11g in different directions, the angle between the direction in which the reflection surface 14a of each prism 14 directly faces and the vertically downward direction from the reflection surface 14a may be set randomly for each prism 14.

The prisms 14 are arranged on the second diffusion surface 11e in a staggered manner, latticed, or randomly at a uniform density. To vary the brightness of the illumination depending on the position, the prisms 14 at different positions may be arranged at different densities on the second diffusion surface 11e, or more specifically, may be more densely arranged in brighter areas. For example, to illuminate the top of the product samples 131 more intensely than the bottom, the prisms 14 may be arranged more densely nearer the distal end face 11b. The density of the prisms 13 on the first diffusion surface 11d and the density of the prisms 14 on the second diffusion surface 11e are adjusted in accordance with the ratio between the amount of light emitted through the first emission surface 11f and that emitted through the second emission surface 11g. For example, to have more light emitted through the second emission surface 11g than through the first emission surface 11f, the prisms 14 on the second diffusion surface 11e are arranged more densely than the prisms 13 on the first diffusion surface 11d.

In FIGS. 4 and 5, the sizes of the prisms 13 and 14 and the thickness of the light guide plate 11 and other dimensions are exaggerated for ease of viewing.

In the illumination device described above, the light guide plate has the bend in the middle, the section extending from the incident surface to the bend, and the section extending from the bend to the distal end face. The light guide plate includes multiple prisms on each section to reflect light propagating within the light guide plate toward the illumination target. The illumination device can thus emit light in various directions. In particular, the illumination device can illuminate the illumination target from the front with the section extending from the bend to the distal end face located in front of the illumination target. The illumination device using the transparent light guide plate does not hide the illumination target from the viewer viewing the illumination target from the front.

In one modification, a light guide plate may display a pattern that appears to be glowing frontward, and include multiple prisms arranged in the pattern.

Figure 6:
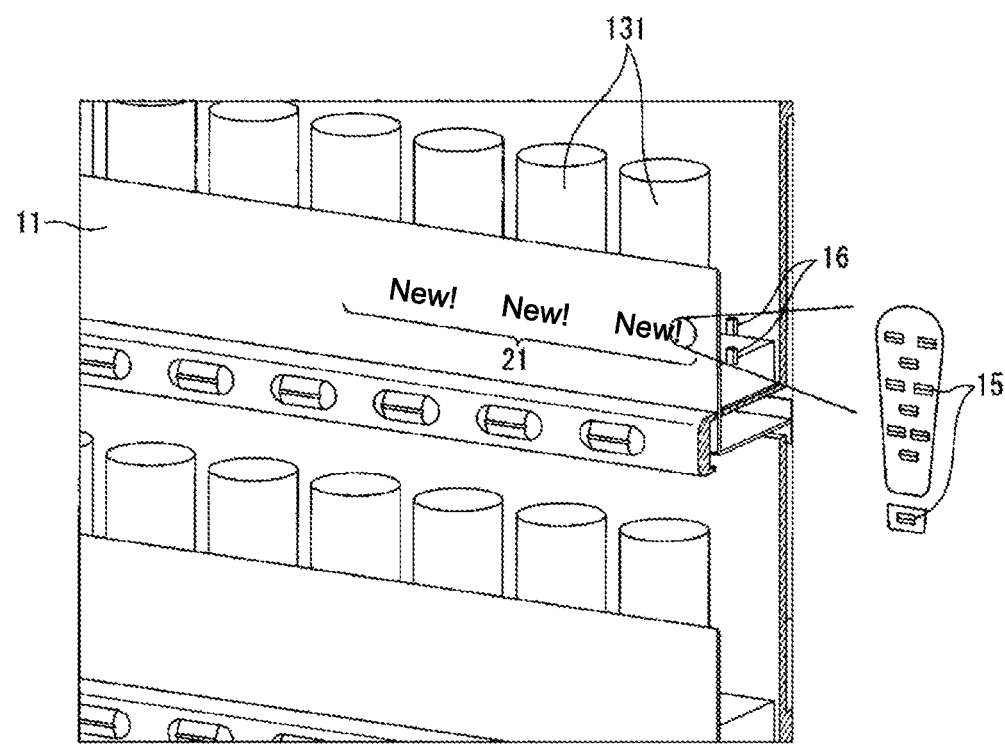
FIG. 6 is a partial schematic perspective view of a light guide plate according to a modification.
Figure 7:
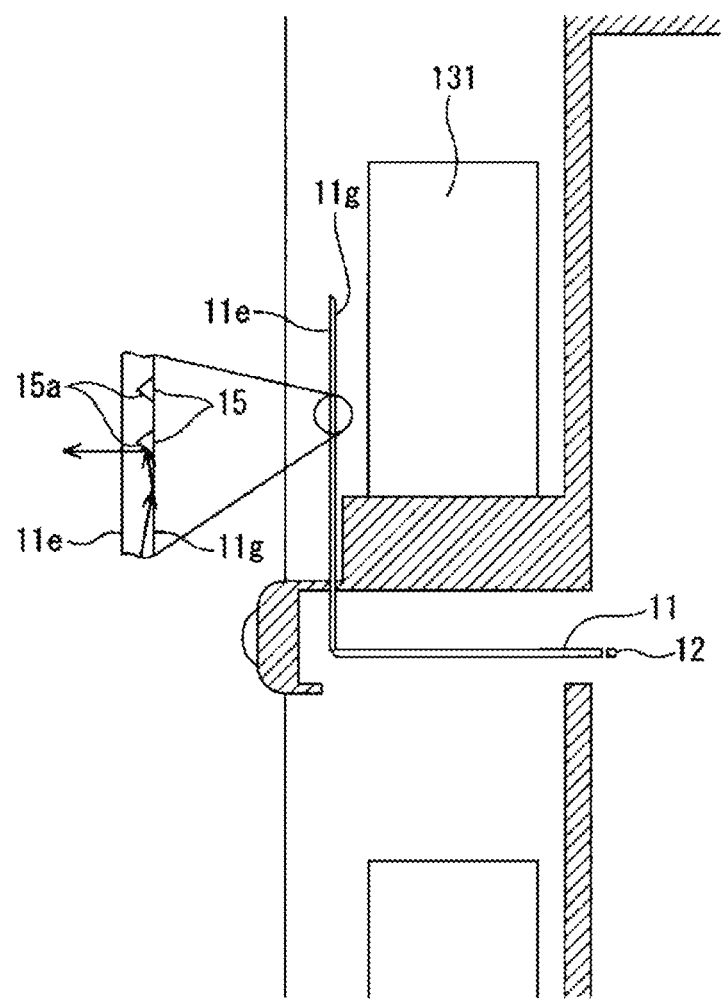
FIG. 7 is a schematic cross-sectional side view of the light guide plate according to the modification.

FIG. 6 is a partial schematic perspective view of a light guide plate according to the modification. FIG. 7 is a schematic cross-sectional side view of the light guide plate according to the modification. The modification differs from the above embodiment in that the second emission surface 11g of the light guide plate 11 includes multiple prisms arranged in a pattern to be displayed. The difference will now be described.

In the modification, the light guide plate 11 displays a pattern 21 that appears to be glowing when viewed from the front. The second emission surface 11g has multiple prisms 15 arranged in the pattern 21. A part of the light from the light source 12 propagating within the light guide plate 11 by total internal reflection is first totally internally reflected by the prisms 15, and then emitted frontward through the second diffusion surface 11e. The viewer can thus visually recognize, together with the product samples 131, the pattern 21 that appears to be glowing in front of the product samples 131 on the second diffusion surface 11e of the light guide plate 11 while the light source 12 is on.

The prisms 15 are arranged along the pattern 21 in a staggered manner, latticed, or randomly at a uniform density. To provide bright and dark sections in the pattern 21, the prisms 15 at different positions within the pattern 21 may be arranged at different densities, or more specifically, may be more densely arranged in the brighter section in the pattern 21.

Similarly to the prisms 13 and 14, each prism 15 is, for example, a substantially triangular groove having a predetermined length on the second emission surface 11g. The predetermined length is set to allow the pattern 21 to include the multiple prisms 15 and is set to, for example, about several tens to several hundreds of micrometers. Each prism 15 has a reflection surface 15a at a predetermined slope angle with the second emission surface 11g. The reflection surface 15a provides total internal reflection of light from the light source 12 propagating within the light guide plate 11 to emit the light through the second diffusion surface 11e. In one example, each prism 15 has the reflection surface 15a facing vertically downward. In another example, to have the pattern 21 viewable in various directions, the angle between the direction in which the reflection surface 15a directly faces and the vertically downward direction from the reflection surface 15a may be set randomly for each prism 15.

The density of the prisms 14 on the second diffusion surface 11e and the density of the prisms 15 on the second emission surface 11g are adjusted in accordance with the ratio between the amount of light emitted through the second emission surface 11g and that emitted through the second diffusion surface 11e for displaying the pattern 21. For example, to have more light emitted through the second diffusion surface 11e than through the second emission surface 11g, the prisms 15 on the second emission surface 11g are arranged more densely than the prisms 14 on the second diffusion surface 11e. For easy viewing of the pattern 21, no prism 14 may be arranged in an area on the second diffusion surface 11e overlapping the pattern 21 when the light guide plate 11 is viewed from the front.

The illumination device according to the modification displays a pattern that appears glowing to the viewer while emitting light in various directions with a single light source. In particular, in front of the illumination target, the illumination device can emit light for illuminating the target from one surface of the light guide plate and can display a pattern that appears glowing to the viewer on the other surface of the light guide plate. The illumination device can thus illuminate the illumination target while displaying a pattern superimposed on the target.

In the modification, the pattern 21 may use a light source different from the light source 12 for illumination. For example, one of the side surfaces of the section of the light guide plate 11 from the bend 11c to the distal end face 11b may serve as a second incident surface, and a second light source 16 may be located to face the second incident surface. The second light source 16 may include multiple light emitters arranged in a row in the longitudinal direction of the second incident surface. Similarly to the light emitters in the light source 12, the light emitters in the second light source 16 are, for example, light-emitting diodes, incandescent lamps, or fluorescent lamps.

In this modification, the light emitted from the second light source 16 and entering the light guide plate 11 through the second incident surface propagates in a direction different from the direction in which the light emitted from the first light source 12 and entering the light guide plate 11 propagates. In this case, the prisms 15 may be arranged to have the reflection surfaces 15a facing the second light source 16. The prisms 15 can thus direct the light emitted from the second light source 16 and entering the light guide plate 11 frontward, or more specifically, can emit light toward the viewer through the second diffusion surface 11e.

In this modification, the light source used for the pattern to appear glowing is separate from the light source for illumination. The illumination device can thus increase both the amount of light for illumination emitted through the second emission surface 11g and the amount of light for pattern display emitted through the second diffusion surface 11e.

The light emitters in the light source 12 may emit light having the same or a different color as or from the light emitted from the light emitters in the second light source 16. When the light emitters in the light source 12 emits light having a different color from the light emitted from the light emitters in the second light source 16, the illumination device may show, to the viewer, a pattern having a different color from the illumination light superimposed on the illumination target.

In the modification, the prisms 14 may be eliminated. In this case, no light is emitted toward the product samples 131 through the second emission surface 11g. The area behind the pattern is thus darker to allow the viewer to visually recognize the pattern easily. In this case as well, the illumination device can illuminate the lower product samples 131 with light emitted through the first emission surface 11f, while displaying the pattern viewable from the front.

In another modification, a collimator lens may be located between the incident surface 11a of the light guide plate 11 and the light source 12 to collimate light emitted from the light source 12. In this case, the light emitted from the light source 12 and collimated through the collimator lens propagates within the light guide plate 11 without greatly spreading in the longitudinal direction of the incident surface 11a. Each prism 13 may have the reflection surface 13a substantially parallel to the longitudinal direction of the incident surface 11a on the plane parallel to the first diffusion surface 11d. Similarly, each prism 14 is arranged to have the reflection surface 14a substantially parallel to the first diffusion surface 11d on the plane parallel to the second diffusion surface 11e.

In another modification, the light guide plate 11 may have a downward bend, in place of the upward bend 11c. In this modification, the illumination device 121 can illuminate the product samples 131 on the lower display shelf 111 from the front and the above. In another modification, the first diffusion surface 11d and the first emission surface 11f may be exchanged with each other. More specifically, the light guide plate 11 may have the lower surface being the first diffusion surface 11d on which the first prisms 13 are located, and the upper surface being the first emission surface 11f. In this modification, the illumination device 121 can illuminate the product samples 131 from the front and the bottom when the display shelves 111 are formed from a transparent material.

In another modification, a flat light guide plate may be used. In this modification, the light guide plate may be, for example, placed substantially parallel to the front face of the housing 110 and in front of the display shelves 111 and the product samples 131. For example, the lower end face of the light guide plate serves as an incident surface, and a light source may be located to face the incident surface. In the same manner as the prisms on the second diffusion surface in the embodiment and the modifications described above, multiple prisms may be arranged on the surface of the light guide plate not facing the product samples to emit light from the light source propagating within the light guide plate toward the product samples through the surface facing the produce samples. In the same manner as the prisms on the second emission surface in the modifications described above, another set of multiple prisms may be arranged in a display pattern to emit light from the light source propagating within the light guide plate toward the viewer through the surface not facing the product samples on the surface facing the product samples. The illumination device according to this modification can also display the pattern that appears glowing to the viewer while illuminating the product samples with a single light source.

As described above, those skilled in the art can make various changes in accordance with embodiments implemented within the scope of the present invention.

The invention claimed is:

1. An illumination device, comprising:
a transparent light guide plate comprising an end face comprising an incident surface, and a bend located between the incident surface and a distal end face opposite to the incident surface; and
a light source facing the incident surface, wherein
the light guide plate comprises:
a plurality of first prisms on a first surface of the light guide plate extending from the incident surface to the bend, the plurality of first prisms being configured to reflect light emitted from the light source and entering the light guide plate through the incident surface and emit the light in a downward direction through a second surface opposite to the first surface;
a plurality of second prisms on a third surface of the light guide plate extending from the distal end face to the bend, the third surface comprising a surface of the light guide plate facing in an outward direction, the plurality of second prisms being configured to reflect light emitted from the light source and entering the light guide plate through the incident surface and emit the light in an inward direction through a fourth surface opposite to the third surface; and
a plurality of third prisms arranged in a predetermined pattern on the fourth surface, the plurality of third prisms being configured to reflect light entering the light guide plate and emit the light through the third surface to display the predetermined pattern in the outward direction, and the distal end face comprises an angled slope formed such that light is emitted from the distal end face in a direction that is angled upward relative to the light emitted through the fourth surface.

2. The illumination device according to claim 1, wherein the light guide plate comprises a second incident surface on one of side surfaces of the light guide plate extending from the bend to the distal end face and adjacent to the distal end face, the illumination device further comprises a second light source facing the second incident surface, and each of the plurality of third prisms comprises a reflection surface facing the second light source to reflect light emitted from the second light source and entering the light guide plate through the second incident surface and emit the light through the third surface.

3. The illumination device according to claim 1, wherein an intersection of the second surface and the third surface opposite an intersection of the first surface and the fourth surface comprises a chamfered surface of the light guide plate at the bend.

4. The illumination device according to claim 2, wherein the light source emits light comprising a color different from a color of light emitted from the second light source.

5. The illumination device according to claim 2, wherein an intersection of the second surface and the third surface opposite an intersection of the first surface and the fourth surface comprises a chamfered surface of the light guide plate at the bend.

6. The illumination device according to claim 4, wherein an intersection of the second surface and the third surface opposite an intersection of the first surface and the fourth surface comprises a chamfered surface of the light guide plate at the bend.

7. An exhibition apparatus, comprising:
a mount on which an exhibition target is mountable; and
an illumination device configured to illuminate the exhibition target, wherein
the illumination device comprises:
a transparent light guide plate comprising a back end face comprising an incident surface, a bend between the incident surface and a distal end face opposite to the incident surface, a section from the incident surface to the bend extending from back to front, and a section from the distal end face to the bend located in front of the exhibition target; and
a light source facing the incident surface,
the light guide plate comprises:
a plurality of first prisms on a first surface of the light guide plate extending from the incident surface to the bend, the plurality of first prisms being configured to reflect light emitted from the light source and entering the light guide plate through the incident surface and emit the light in a downward direction through a second surface opposite to the first surface;
a plurality of second prisms on a third surface of the light guide plate facing in an outward direction not facing the exhibition target and extending from the distal end face to the bend, the plurality of second prisms being configured to reflect light emitted from the light source and entering the light guide plate through the incident surface and emit the light in an inward direction through a fourth surface opposite to the third surface; and
a plurality of third prisms arranged in a predetermined pattern on the fourth surface, the plurality of third prisms being configured to reflect light entering the light guide plate and emit the light in the outward direction through the third surface to display the predetermined pattern, and
the distal end face comprises an angled slope formed such that light is emitted from the distal end face in a direction that is angled upward relative to the light emitted through the fourth surface.

8. The exhibition apparatus according to claim 7, wherein an intersection of the second surface and the third surface opposite an intersection of the first surface and the fourth surface comprises a chamfered surface of the light guide plate at the bend.

\* \* \* \* \*